United States Patent [19]

Parra

[11] Patent Number: 4,866,849
[45] Date of Patent: Sep. 19, 1989

[54] SURVEYING TARGET WITH HIGH INTENSITY DISCHARGE LAMP

[75] Inventor: Jorge M. Parra, New Port Richey, Fla.

[73] Assignee: Pioneer Data Processing, Inc., Holiday, Fla.

[21] Appl. No.: 65,446

[22] Filed: Jun. 23, 1987

Related U.S. Application Data

[63] Continuation-in-part of Ser. No. 64,419, Jun. 22, 1987, and a continuation-in-part of Ser. No. 64,418, Jun. 22, 1987, Pat. No. 4,796,040.

[51] Int. Cl.⁴ .................................................. G01C 15/06
[52] U.S. Cl. ......................................... 33/293; 362/109
[58] Field of Search ................. 33/293, 294, 295, 296, 33/241, DIG. 21, 227, 228, 234, 286, 287; 362/293, 362, 348, 303, 305, 346, 109; 116/202, 209

[56] References Cited

U.S. PATENT DOCUMENTS

| | | |
|---|---|---|
| 2,488,541 | 11/1949 | Holme . |
| 2,969,594 | 1/1961 | Palmer . |
| 3,678,590 | 7/1972 | Hayward . |
| 3,790,277 | 2/1974 | Hogan ............................. 356/400 X |
| 3,857,639 | 12/1974 | Mason ................................. 33/293 X |
| 4,470,675 | 9/1984 | DiGianfilippo et al. ........ 353/103 X |
| 4,494,870 | 1/1985 | Hentschel et al. ................. 33/293 X |

FOREIGN PATENT DOCUMENTS 1332512 10/1973 United Kingdom .
2154108 8/1985 United Kingdom .

Primary Examiner—William A. Cuchlinski, Jr.
Assistant Examiner—Patrick R. Scanlon
Attorney, Agent, or Firm—John M. Rommel

[57] ABSTRACT

A surveying target having a housing with one open side, encloses a high intensity gas discharge flash tube. A light absorbing surface in the housing bounding the back and sides of said flash tube prevents reflection of light, thereby maintaining a relatively discrete outline. A light transparent cover member on said open side for passing light from said high intensity gas discharge tube toward an observer. A transmitter and receiver, and including resettable code devices are provided for limiting responsive operation only to transmitters transmitting a preassigned code and a corresponding receiver for detecting said preassigned code. A light transparent cover member filters light from said lamp of a predetermined wave length. A surveying system using an optical instrument for binocular visioned observers is also disclosed.

18 Claims, 2 Drawing Sheets

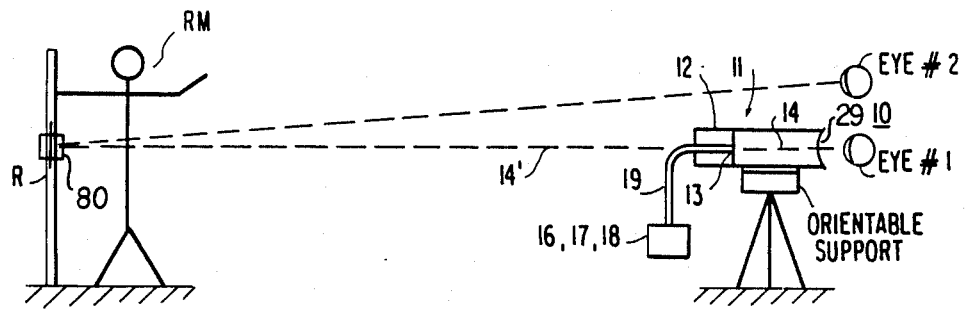
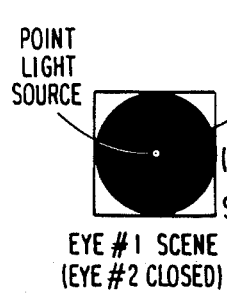
FIG. 6
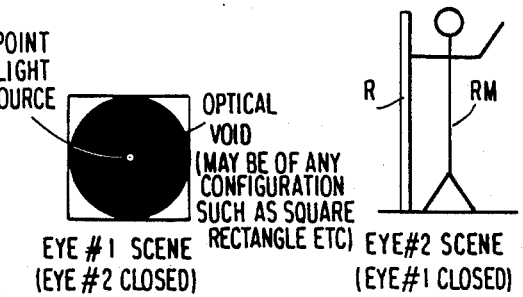
FIG. 7
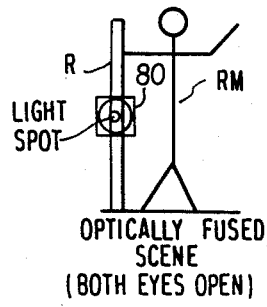
FIG. 8
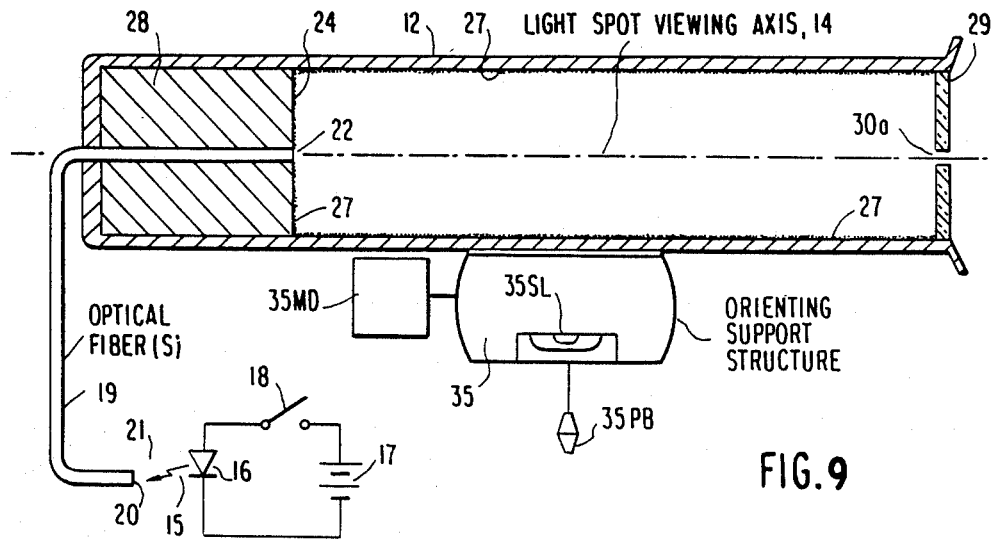

SURVEYING TARGET WITH HIGH INTENSITY DISCHARGE LAMP

REFERENCE TO RELATED APPLICATIONS

This application is related to and is a continuation-in-part of my application Ser. No. 064,419 filed June 22, 1987 for "OPTICAL INSTRUMENT", and my application Ser. No. 064,481 filed June 22, 1987 for "BOUNDARY SETTING DEVICE" now U.S. Pat. No. 4,796,040.

BACKGROUND AND BRIEF DESCRIPTION OF THE INVENTION

The present invention relates to targets which are useful for various applications such as surveying, sighting and orienting.

Laser light sources have been increasingly used in surveying and various optical sighting and orienting systems. These typically involve a high power laser projecting light upon a distant target and require certain protective measures to avoid damage to the human eye. Moreover, the laser beam expands in diameter with distance. Optical prisms, mirrors and the like have been used as targets, but the larger the light spot, the greater the error. Multiple prisms and mirrors are used in this case.

The object of the present invention is to provide an improved surveying target which does not require the use of high powered lasers and which allows work in any light level, is impervious to thermal waves, functions in fog, rain, haze and smoke, extends the range of standard refractional surveying instruments up to ten times, uses low power, can be retrofitted to current target systems and be operated by remote control. A further object of the invention is to provide a surveying system using the optical instrument disclosed in my above-identified application Ser. No. 064,419 and incorporated herein by reference.

A high intensity gas discharge flash lamp or tube (filled with xenon or krypton gases) is contained in a light absorbing enclosure and oriented to an open side of he enclosure. The enclosure may be of the same physical dimensions and have the same mounting fitments as those used for prism type targets so that they can be retrofitted to and adapted to incorporate this invention. The light absorbing portion of the enclosure keeps the light beams from the discharge tube from expanding and spreading thereby enhancing accuracy of surveying measurements using this invention, particularly at the longer measuring distances made possible thereby. A power supply is controlled to charge a standard discharge capacitor very fast and a high voltage coil steps the voltage up to 700 volts or more. A voltage regulator on the power supply assures a constant pulse discharge rate (which preferably is about 2 per second) when the battery voltage gets low. In addition, a remote radio control is provided to thereby permit close control by the surveyor and make possible reduction in surveying man power.

Thus, the present invention provides an improved surveying target which results in:

1. Allows work at any light level, including night work,
2. Impervious to thermal waves,
3. Functions on fog, rain, haze and smoke,
4. Extends the range of standard refractional surveying instruments up to 10 times, meaning less drops and therefor less cumulative error,
5. Low power consumption,
6. Retrofit into all standard surveying target systems,
7. Will work with the retrolaser surveying system
8. Will give horizontal or vertical reference,
9. Radio remote control available with automatic control number of flashes, and
10. Automatic, no warm-up operation.

The optical instrument disclosed in my above-identified applications uses a lower power collimated point light source surrounded by an optical void and alignable along a predetermined viewing axis. When one eye of the observer is aligned with the point light source and the other eye is viewing a scene, the light spot is optically fused into the scene and where the viewing axis is precisely aligned with the point in the scene where the light spot appears. This provides a surveying system with the following advantages:

(1) greater accuracy,
(2) impervious to:
   (a) condensation,
   (b) rising thermal waves,
   (c) full functions under various light conditions,
(3) minimal power requirements,
(4) range limited only by line of sight,
(5) simpler to use, and
(6) minimal adjustments previous to use.

BRIEF DESCRIPTION OF THE DRAWINGS:

The above and other objects, advantages and features of the invention will become clearer when considered with the following specification and accompanying drawings wherein:

FIG. 5 is a diagrammatic illustration of a surveying system scene using a level transit incorporating the invention, FIG. 6 is a scene viewed by eye No. 1 of FIG. 5, FIG. 7 is the scene viewed by eye No. 2 viewing in the sighting instrument incorporated in the invention, FIG. 8 is the scene viewed by eye No. 1 and eye No. 2 as optically fused by the human brain, and FIG. 9 is a partial section and schematic view of an instrument incorporated in the invention.

DETAILED DESCRIPTION OF THE INVENTION

Figure 1:
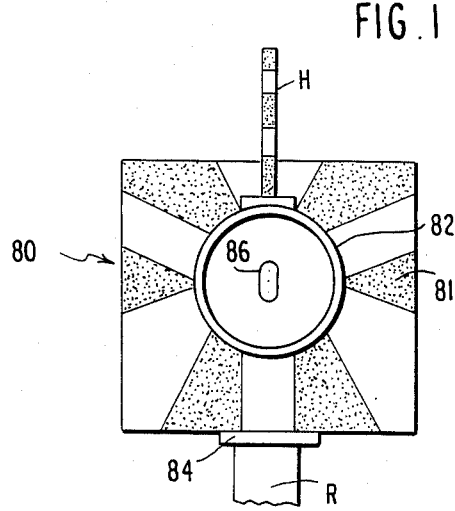
FIG. 1 is a front view of a target incorporating the invention.
Figure 2:
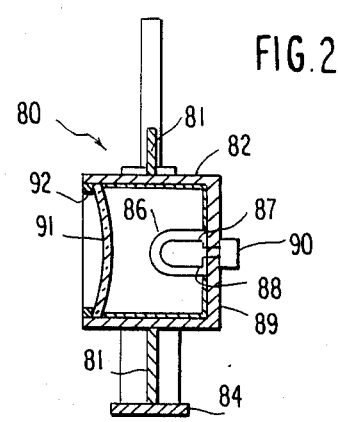
FIG. 2 is a side sectional view of the target shown in FIG. 1.
Figure 3:
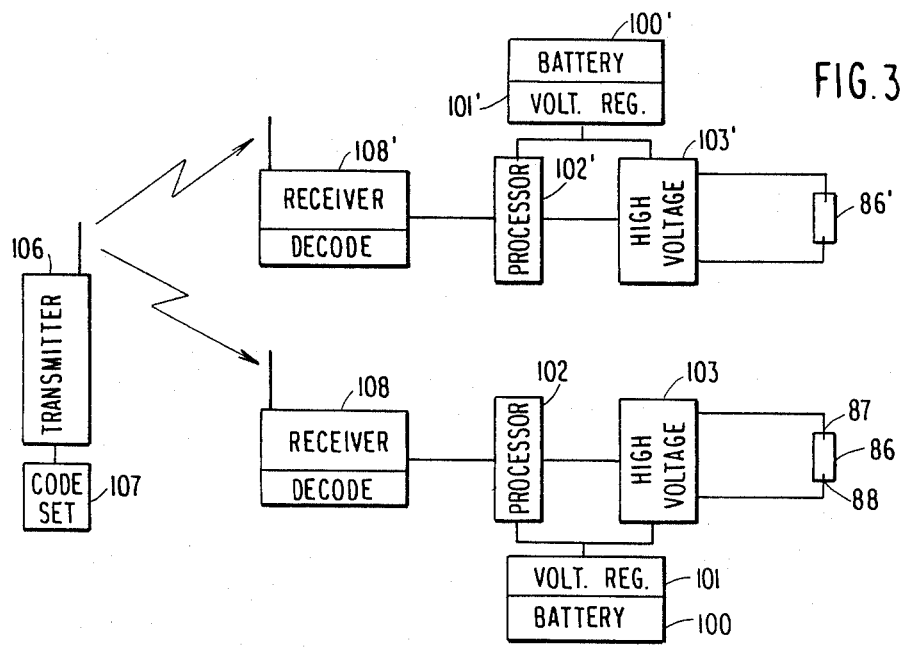
FIG. 3 is a block diagram of the circuit for driving the discharge tube.

A target 80 incorporating the invention is shown in FIGS. 1-3. A conventional surveyor's rod or stadia R and conventional target flag plate 81 (which is black and white with a design) surrounds the frame enclosure 82 which has a conventional depending mounting base 84 which is attachable to stadia rod R and a barber's pole handles H. Enclosure 82 contains a conventional xenon or krypton gas (other gases may be used) filled tube 86, the ends of which contain electrodes 87 and 88 which pass through the rear wall 89 to an electrical fitting 90.

The interior of housing 82 is coated or formed with a light absorbing material to avoid any reflection of light from tube 86. A lens cover 91 maintained in position by expansible arm 92 keeps the housing clear of dust and dirt and in one embodiment is copper tone coated to filter out any "blue" light and enables improved long distance visibility in heavy fog, late afternoon haze, drizzle or light rain.

Referring to the power supply and control system shown in FIG. 3, a battery 100 has its output regulated by voltage regulator 101 so that when the battery weakens, the frequency or rate of operation of the tube 86 is maintained constant. A microprocessor 102 receives power from the battery and is programmed to supply control signals to high voltage circuit 103 which includes a conventional capacitor discharged through a coil which steps up the voltage to 700 volts or more. The microprocessor 102 is programmable to set the rate of discharge and can in turn, be controlled remotely. As illustrated, a remote control transmitter 106 includes a coding device 107 which sets the code signal transmitted by transmitter 106. Receiver 108 receives and decodes the incoming coded signal (thereby assuring that there is no false triggering) and sends a control signal to processor 102. Processor 102 thereupon causes the high voltage circuit 103 to pulse energize the discharge tube 86, via electrodes 87 and 88, a predetermined number of times to cause the emission of a predetermined number of light pulses from the target. It will be appreciated that the tube can be operated to pulse discharge continuously at a predetermined rate (say 2 per second) or by remote control.

Processor 102 can also be programmed to give a predetermined number of flashes (10, 20, 15, etc.) by a coded radio control signal.

Figure 4A:
FIG. 4a and FIG. 4b show two different arrays of discharge tubes.
Figure 4B:
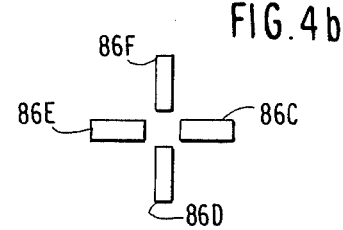

As shown in FIGS. 4a and 4b, two or more tubes may be included in the target and either pulsed simultaneously or driven in a particular sequence.

Referring now to FIG. 5, which depicts a scene in surveying, a rod man RM is shown holding a stadia rod R having target 80 of this invention thereon. The eyes 10 of the surveyor or engineer are designed as eye No. 1 and eye No. 2, it being appreciated that eye No. 1 can be the left or right eye of the observer and the same with eye No. 2. An optical instrument 11, incorporating the invention, has a sighting tube 12 and a source of collimated light 13 positioned along the viewing axis 14 at one end of sighting tube 12. An embodiment of the sighting tube and its component parts are disclosed in FIG. 9.

In the embodiment shown in FIG. 9, insrument 11 includes a source of monochromatic light 15 constituted by a low power source of monochromatic radiation, such as PN junction diode 16 which is energized by battery 17 through switch 18. A fiber optic wave guide or optical wire 19 has one end 20 adapted to receive light energy 21 from junction diode 16 and convey same to end 22 (which preferably is squared or normal to the optical or light spot viewing axis 14) which is located along the light spot view axis 14 of the instrument 11. In a preferred embodiment, the area 24 immediately surrounding the end 22 of the fiber optic element 19 is formed as an optical void and, preferably, is coated with a light absorbent substance such as a flat or matte black coating material 27. In this embodiment, the end 22 of fiber optic wave guide 19 has a diameter of about one (1) millimeter. Fiber optic wave guide 19 serves as a collimator for the light rays emitted by PN junction diode 16. In a preferred embodiment, the length of the fiber optic element is between about 1 and 5 meters. An eye piece 29 which may be a lens, constitutes an eye alignment device which assists the surveyor observer in alighning eye No. 1 with the predetermined viewing axis 14. The alignment device shown has a centrally located perforation 30(a) which is coaxial with viewing axis 14 and of approximately the same diameter as the light spot at end 22 of fiber optic wave guide 19. The alignment indicia may also be silk-screened cross-hair or fiducial markings, with the central portions omitted to permit the light spot to be observed more clearly, or a circle engraved with the center aligned with the predetermined viewing axis 14 of the light spot at the end 22 of the fiber optic wave guide 19.

As shown in FIG. 9, the orienting support structure 35, may be the leveling and plumbing portions of a surveyor's level, tranit or theodolite, etc., which has a plumb bob 35PB and spirit, level or bubble level 35SL and supported by a tripod or other ground engaging structure. The measurement devices diagrammatically illustrated at 35MD are the usual angle reading instruments and may be mechanical or electronic with a microprocessor and liquid crystal, or other electronic displays.

While the invention has been shown and described in relation to the preferred embodiments, it will be appreciated that various modifications and adaptations of the invention will be readily apparent to those skilled in the art and it is intended to encompass such modifications and adaptations within the spirit and scope of the claims appended hereto.

What is claimed is:

1. A surveying target comprising, in combination,
   a housing having an open side,
   a high intensity gas discharge flash tube means mounted in said housing,
   a light absorbing means in said housing bounding the back and sides of said flash tube,
   a light transparent cover member on said open side for passing light from said high intensity gas discharge tube toward an observer, and
   an electrical power supply means for energizing said high intensity gas discharge flash tube means.

2. Surveying target as defined in claim 1 including transmitter and receiver means for controlling said power supply means and including resettable code means for limiting responsive operation only to transmitters transmitting a preassigned code and a corresponding receiver for detecting said preassigned code.

3. Surveying target as defined in claim 1 wherein said high intensity discharge flash tube means is constituted by a plurality of separate tubes.

4. Surveying target as defined in claim 3 wherein said high intensity lamps are located in a common housing and positioned in a predetermined pattern.

5. Surveying target as defined in claim 1 wherein said light transparent cover member filters light from said lamp of a predetermined wave length.

6. A surveying system comprising the surveying target defined in claim 1, and an optical instrument comprising:
   (1) a low power collimated light point source,
   (2) means for orienting said collimated light point source along a predetermined viewing axis for one eye of an observer, (3) an orientable support structure including means for measuring the orientation of said support structure relative to said target.

(4) means mounting said means for orienting on said orientable support structure for said predetermined viewing axis for one eye of an observer whereby when said observer is viewing a scene through his other eye an optically fused image is presented to said observer with said predetermined viewing axis including the said target in said scene wherein said point source appears.

7. A surveying target for use in making precise angle measurements comprising, in combination, a housing, a high intensity gas discharge lamp for generating light in a predetermined pattern defined by said lamp, means for mounting said lamp in said housing, an electrical power supply means connected to energize said lamp, and means for controlling the light from said high intensity gas discharge lamp such that said light is more impervious to ambient conditions including thermal waves and functions on fog, rain, haze and smoke.

8. A surveying target as defined in claim 7 wherein said means for controlling the light from said high intensity discharge lamp includes filter means to assure that light from said lamp is of a predetermined wave length.

9. A surveying target as defined in claim 7 wherein said means for controlling the light from said high intensity discharge lamp includes a filter for removing "light" light and improve long distance visibility thereof in fog, late afternoon haze, drizzle or light rain.

10. A surveying target as defined in claim 7 including transmitter and receiver means controlling energization of said lamp from said electrical power supply means, and including resettable code means for limiting responsive operation only to transmitters transmitting a preassigned code and a corresponding receiver for detecting said preassigned code.

11. A surveying target as defined in claim 7 wherein said high intensity discharge flash lamp is constituted by a plurality of separate gas discharge tubes arrayed in said predetermined pattern.

12. A surveying target as defined in claim 11 wherein said high intensity lamps are located in a common housing and positioned in a predetermined pattern.

13. A surveying target as defined in claim 7 wherein said means for controlling includes filter means for filtering light from said lamp of a predetermined wave length.

14. A surveying target as defined in claim 7 including light absorbing means in said closed housing to prevent reflection of light from said gas discharge flash lamp.

15. A surveying target as defined in claim 7 wherein said power supply means includes a battery and a voltage regulator connected to said battery and a high voltage generating circuit connected between said voltage regulator and same lamp.

16. A surveying target as defined in claim 7 wherein said power supply includes a battery, a high voltage circuit connected between said battery and said high intensity lamp, and a microprocessor programmed to supply control signals to said high voltage circuit.

17. A surveying target as defined in claim 7 including means for maintaining a relatively discrete outline of said high intensity gas discharge lamp when light is emitted therefrom.

18. A surveying system comprising the surveying target defined in claim 7, and an optical instrument, said optical instrument comprising:

(1) a lower power collimated light point source, (2) means for orienting said collimated light point source along a predetermined viewing axis for one eye of an observer, (3) an orientable support structure including means for measuring the orientation of said support structure relative to said discharge lamp, (4) means mounting said means for orienting on said orientable support structure for said predetermined viewing axis for one eye of an observer whereby when said observer is viewing the light from said discharge lamp through his other eye an optically fused image is presented to said observer with said predetermined viewing axis including the said discharge lamp in said scene wherein said collimated light point source appears.

* * * * *